US007437235B2

(12) United States Patent
Carrado, Jr.

(10) Patent No.: US 7,437,235 B2
(45) Date of Patent: Oct. 14, 2008

(54) HALL EFFECT PICK-UP WITH TIMING CORRECTION

(75) Inventor: Fred Carrado, Jr., Guilford, CT (US)

(73) Assignee: Moroso Performance Products, Inc., Guilford, CT (US)

( * ) Notice: Subject to any disclaimer, the term of this patent is extended or adjusted under 35 U.S.C. 154(b) by 0 days.

(21) Appl. No.: 11/472,616

(22) Filed: Jun. 22, 2006

(65) Prior Publication Data

US 2007/0005221 A1 Jan. 4, 2007

Related U.S. Application Data

(60) Provisional application No. 60/693,177, filed on Jun. 23, 2005.

(51) Int. Cl.
*G06F 19/00* (2006.01)

(52) U.S. Cl. ........................................ 701/105; 701/102

(58) Field of Classification Search ................. 701/102, 701/105, 110, 111; 73/116, 117.3
See application file for complete search history.

(56) References Cited

U.S. PATENT DOCUMENTS 4,357,662 A * 11/1982 Schira et al. ................ 701/111
5,991,685 A * 11/1999 Fukuchi et al. ............. 701/110
7,013,871 B2 * 3/2006 Zhu et al. .............. 123/406.21

* cited by examiner

*Primary Examiner*—Willis R. Wolfe, Jr.
*Assistant Examiner*—Johnny H. Hoang
(74) *Attorney, Agent, or Firm*—St. Onge Steward Johnston & Reens LLC

(57) ABSTRACT

A circuit and method for correcting signal timing. The circuit and method generate a first signal with a first phase that is out of phase with a periodic object, generate a voltage signal that corresponds to the frequency of the first signal and generate a second signal based on the first signal and the voltage signal, the second signal having a second phase that is substantially in phase with the periodic object.

23 Claims, 3 Drawing Sheets

HALL EFFECT PICK-UP WITH TIMING CORRECTION

PRIOR APPLICATION

Applicant claims priority benefits under 35 U.S.C. §119(e) of U.S. Provisional Patent Application Ser. No. 60/693,177 filed Jun. 23, 2005.

FIELD OF THE INVENTION

This invention relates to ignition timing devices, more particularly to ignition timing devices with timing correction.

BACKGROUND OF THE INVENTION

Hall Effect sensors are used in many automobile applications. One application is to use a Hall Effect sensor to measure the timing in ignition systems. Other applications use Hall Effect sensors to detect the position of the crankshaft and camshaft and to monitor engine RPM. The signal generated by these sensors are used to ensure that proper engine timing is maintained.

In electronic ignition systems, Hall Effect sensors are used to ensure that spark plugs ignite a compressed air-fuel mixture within the engine at an optimum position. To do so at least one ferrous target is mounted or integrated into a rotating engine component, such as the crank shaft. As the target approaches the Hall Effect sensor, containing a magnet, the sensor detects the flux field changes and produces an electric signal. The electric signal in turn is processed and used to trigger an ignition box. The electric signal can be a signal that is either 12 volts or ground and depends on the relative position of the target to the sensor. As the ferrous target approaches a sensor the field flux increases through the sensor. At a critical field flux density the sensor switches from 5 volts, the peak, to ground, the low. The minimum distance position represents the moment when the engine is at peak power, such as optimum compression in a combustion chamber. The passing of the target past the sensor creates a pulse with a width. The pulse has a leading edge that transitions from 5 volts to ground and a trailing edge that transitions from ground to 5 volts. The pulse is modified to a 12 volt high and the ignition box triggers the spark plugs as it detects a 0 to 12 volt edge rise in the pulse. The intention is for the spark plugs to ignite when the engine can produce peak power.

FIG. 1 depicts a Hall Effect Pickup incorporated into an engine component 100. Engine component 100 comprises a rotating shaft 111, which is coupled to oscillating piston elements (not shown) in the engine. Coupled to shaft 111 is reluctor 112. Reluctor 112 comprises 8 ferrous blades 113. The position of the blades 113 on Reluctor 112 corresponds to the compression positions of the piston elements. Engine component 100 also comprises a bell distributor housing 114 that partially encompasses shaft 111. A Hall Effect sensor 115 is coupled to the inner wall of housing 114. As the shaft 111 rotates, the blades 113 of reluctor 112 also rotate. As a first blade 113 approaches sensor 115 the sensor 115 detects the increasing flux field strength. The field strength will be at its maximum when the spacing between sensor 115 and blade 113 is at a minimum. At a critical flux field strength, the sensor 115 will trigger and switch from 5 volts to ground. The rotation of blades 113 past sensor 115 decreases the field strength about sensor 115. The field increases once again as a second blade approaches the sensor 115. The rotation of blades 113 means that sensor 115 is producing a signal with a period that will correspond to the time between each blade reaching a minimum separation from the sensor 115. Thus, the frequency of the resulting Hall Effect signal reflects the revolutions per minute of the reluctor 112, and consequently the engine. At low RPMs, the frequency of the Hall Effect signal will be low, and consequently long periods. At high RPMs, the frequency of the Hall Effect signal will be high, and consequently short periods.

In order to have engine peak power the trigger of the Hall Effect signal should occur at the same moment in time as a blade being at a minimum separation from the sensor. However, there is an inherent delay between the position of a blade and the trigger of the Hall Effect signal in time. As a result, the leading edge of a pulse will be off by a time t1 from the moment when the blade 113 is first in detection proximity to the sensor 115 and off by a time t3 from the moment when the blade 113 moves away from the detection proximity of sensor 115. The time t1 should correspond or be equal to time t3. As a result, the triggering edge of the pulse is displaced to a moment that does not correspond to the minimum spacing of the blade 113 to the sensor 115 or the optimum power position of the engine. The time span between the leading edge of the pulse and the moment that the blade moves away from the detection proximity is considered time t2. Thus, the phase of the Hall Effect signal will not accurately represent the position of the blade in time. This can be due to the delay in the Hall Effect sensor detecting the position of a rotating blade and the time it takes for the Hall Effect sensor to process a signal. By the time that the triggering edge of the Hall Effect signal reaches a spark plug the engine is no longer in a position of peak power, such as optimum piston compression. This results in a loss of engine efficiency. When an engine operates at low revolutions per minute the period of a Hall Effect signal is relatively long. As a result, the relationship between degree of displacement from peak power and ignition, i.e. the degree in which the signal and piston are out of phase may only be slight. However, when an engine is operating at high revolutions per minute the period of a Hall Effect signal is much shorter. This means that the degree to which peak power and the signal are out of phase is much more pronounced and significant. As a result, there is a greater loss of efficiency at higher RPMs.

What is needed is a method and device that achieves maximum precision of engine timing. It would be beneficial if such a method could correct the timing of a Hall Effect sensor. It would also be beneficial if the method could be achieved by a circuit that is coupled to the Hall Effect sensor.

SUMMARY OF THE INVENTION

This objective is achieved by a method that includes the steps of generating a first signal with a first phase that is out of phase with a periodic object; generating a voltage signal that corresponds to the frequency of the first signal; and generating a second signal based on the first signal and the voltage signal, the second signal having a second phase that is substantially in phase with the periodic object.

Another aspect of the method is to supply the first signal and the voltage signal to a timing circuit and to supply the first signal to a frequency to voltage converter.

A further aspect of the method is for the frequency to voltage converter to generate the voltage signal in linear relation to the frequency of the first signal and for the timing circuit to generate the second signal based on the voltage signal and the first signal.

The objective is also achieved by a circuit comprising a first signal circuit that generates a first signal with a first phase that is out of phase with a periodic object; a voltage signal circuit that produces a voltage signal that corresponds to the frequency of the first signal; and a timing circuit that receives the first signal and the voltage signal and produces a second signal with a second phase that is substantially in phase with the periodic object.

The first signal circuit can include a sensor such as a Hall Effect sensor that is positioned to detect the motion of the periodic object and generates a Hall Effect signal. The voltage signal circuit can include a frequency to voltage converter that produces a voltage level that is linearly related to the frequency of the first signal.

The circuit can be incorporated in a system that includes a periodic object such as a rotating shaft or at least one oscillating piston. The second signal can be supplied to an ignition box through a buffer circuit at the moment when an engine is in a state of optimum power.

Other objects of the invention and its particular features and advantages will become more apparent from consideration of the following drawings and accompanying detailed description.

DETAILED DESCRIPTION OF THE INVENTION

Figure 1:
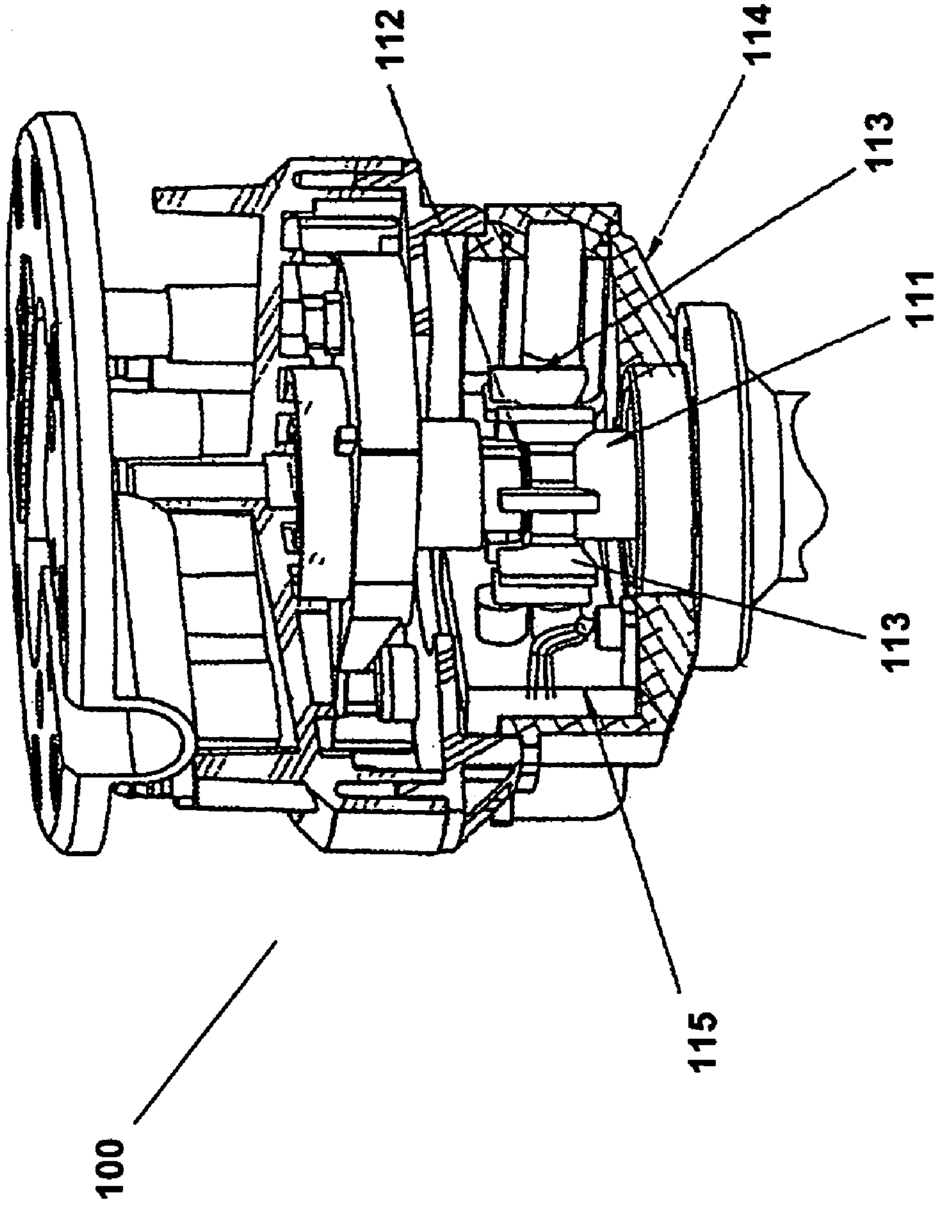
FIG. 1 is a depiction of a Hall Effect sensor incorporated into an engine system.
Figure 2:
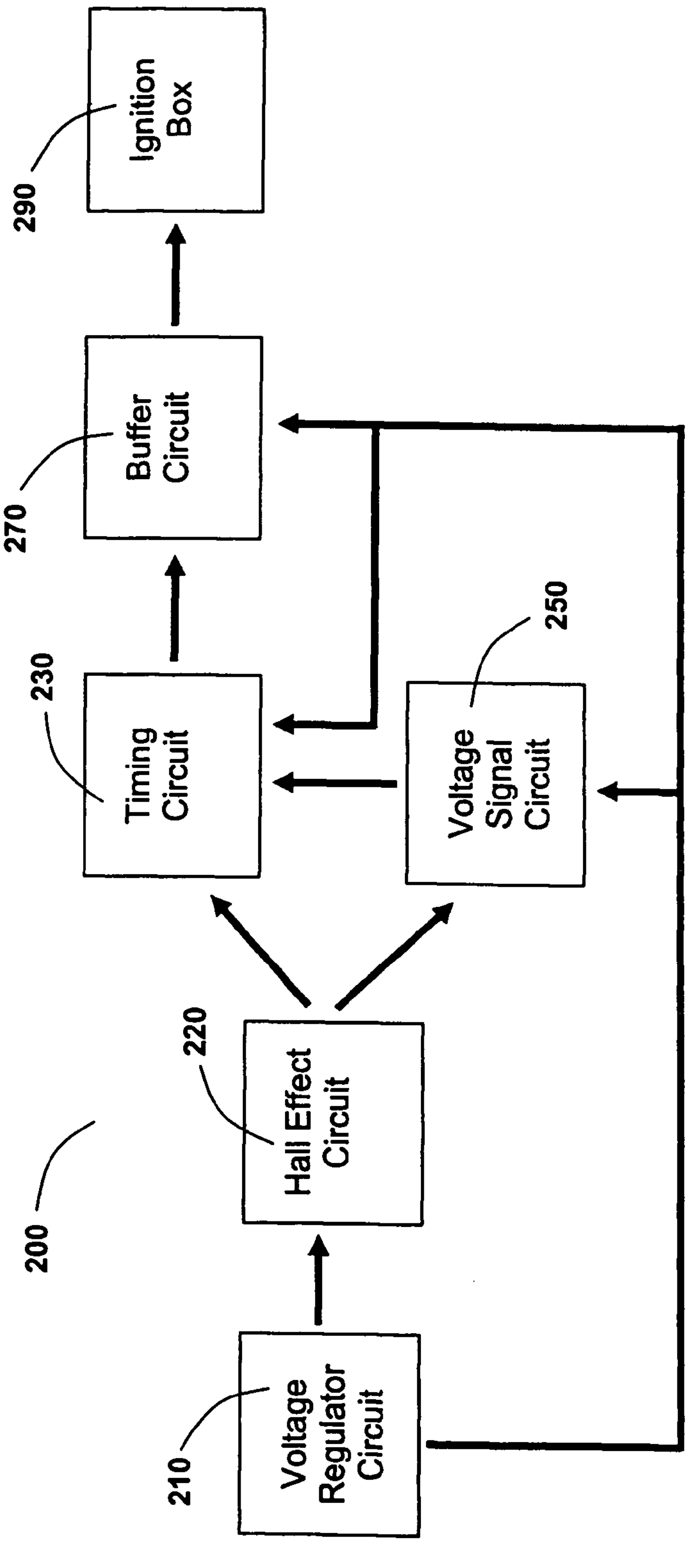
FIG. 2 is a flow diagram of the processing of a signal from a Hall Effect sensor with correction of the signal.

FIG. 2 is a depiction of an arrangement 200 of elements and steps for correcting the signal timing produced by a sensor. A voltage regulator circuit 210 generates a regulated voltage from a battery supply to circuits 220, 230, 250, and 270. Hall Effect circuit 220 produces a Hall Effect signal that is supplied to a voltage signal circuit 250. The voltage signal circuit 250 converts the Hall Effect signal to a constant voltage signal level that depends upon the frequency of the Hall Effect signal. If the frequency were to change, the voltage level produced would be altered accordingly. This voltage signal level and the Hall Effect signal are supplied to a timing circuit 230. The timing circuit 230 applies the voltage signal from circuit 250 to the Hall Effect signal. This alters the period or phase of the Hall Effect signal such that a corrected signal is produced by timing circuit 230. The corrected signal is supplied to buffer circuit 270 which inverts the corrected signal and transfers the corrected signal to an ignition box 290.

Figure 3:
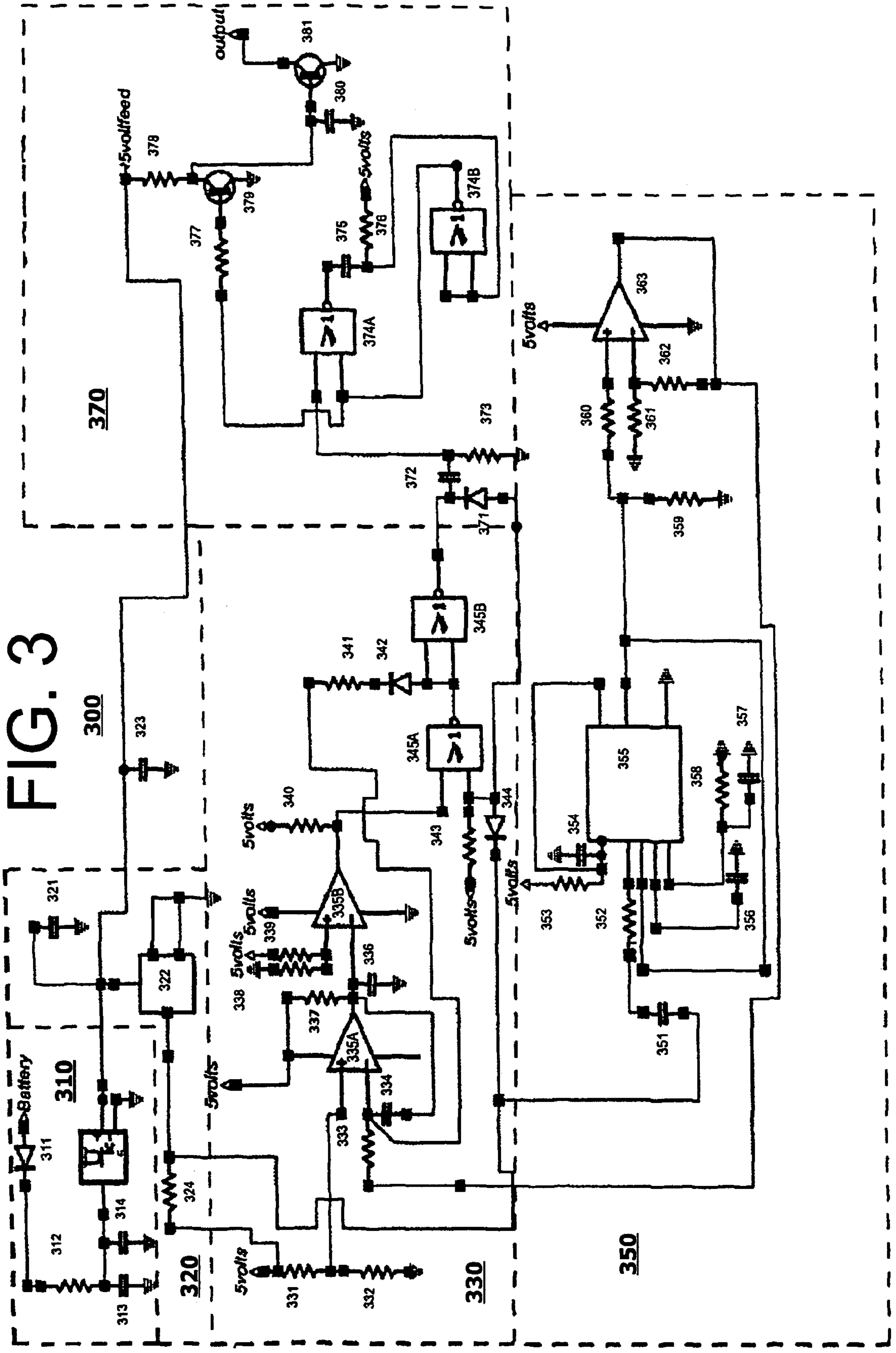
FIG. 3 is a depiction of a circuit that corrects a signal from a Hall Effect Sensor.

FIG. 3 depicts a circuit 300 that incorporates the elements and sequence of steps identified in FIG. 2. A list of parts for circuit 300 are as follows:

| | |
|---|---|
| 311 | D4 (1N4002) |
| 312 | R2 (10 OHM ¼ WATT) |
| 313 | CI (33 UFD @ 35 WVDC) |
| 314 | C2 (.01 UFD) |
| 315 | U1 (78L05A) (VOLTAGE REGULTAOR) |
| 321 | C3 (1 UFD) |
| 322 | U5 (ATS672LSB-LN) (HALL EFFECT SENSOR) |
| 323 | C13 (.01 UFD) |
| 324 | R1 (560 OHM) |
| 331 | R5(IK OHM) |
| 332 | R13 (1K OHM) |
| 333 | R4 (100K OHM) |
| 334 | C4 (.47 UFD) |
| 335A | U5 (COMPARITOR-LMV33I) |

-continued

| | |
|---|---|
| 335B | U5 (COMPARITOR-LMV33I) |
| 336 | C5 (.022 UFD) |
| 337 | R8 (22K OHM) |
| 338 | R7 (1.5K OHM) |
| 339 | R6 (10K OHM) |
| 340 | R3 (10K OHM) |
| 341 | R22 (6.8K OHM) |
| 342 | DI (1N4448 DIODE) |
| 343 | R9 (10K OHM) |
| 344 | D3 (1N4448 DIODE) |
| 345A | U3 (14001, CMOS OR GATE) |
| 345B | U3 (14001, CMOS OR GATE) |
| 351 | C1 (1 UFD) |
| 352 | R5 (10K OHM) |
| 353 | R11 (470 OHM) |
| 354 | C9 (22 UFD) |
| 355 | U2 (LM2917) |
| 356 | C8 (.01 UFD) |
| 357 | C7 (1 UFD) |
| 358 | R21 (36K OHM) |
| 359 | R14 (1K OHM) |
| 360 | R18 (10K OHM) |
| 361 | R17 (100K OHM) |
| 362 | R16 (33K OHM) |
| 363 | U4 (OPAMP OPA364A) |
| 371 | D2 (1N4448 DIODE) |
| 372 | C6 (150 PF) |
| 373 | R10 (10 MEG OHM) |
| 374A | U3 (14001, CMOS OR GATE) |
| 374B | U3 (14001, CMOS OR GATE) |
| 375 | C10 (.01 UFD) |
| 376 | R12 (100K OHM) |
| 377 | R20 (5.6K OHM) |
| 378 | R19 (560 OHM) |
| 379 | Q1 (NSB7002A FET) |
| 380 | C13 (.01 UFD) |
| 381 | Q2 (NSB7002A FET) |

The circuit 300 incorporates a voltage regulator circuit 310, a Hall Effect circuit 320, a timing circuit 330, a voltage signal circuit 350, and a buffer circuit 370. The dashed lines in FIG. 3 indicate the different regions of circuit 300 that correspond to circuits 310, 320, 330, 350 and 370. The voltage regulator circuit 310 regulates the voltage from a battery 311 to 5 volts. This ensures that any voltage fluctuation from battery 311 does not effect the correction of the signal from Hall Effect sensor 322. The voltage regulator circuit 310 supplies a voltage to circuits 320, 330, 350, and 370.

Hall Effect circuit 320 comprises a Hall Effect sensor 322, such as an Allegro ATS672LSB-LN Hall effect sensor. The Hall Effect sensor 322 produces a signal that represents the rotation of reluctor 112 and the relative position of blades 113 to sensor 322. The signal comprises a low, or trough, that represents the blade in close proximity to the sensor 322 and a high, or peak, that represents the blade at a position away from the sensor 322. Due to the delay in detection and processing by sensor 322 the leading edge of a pulse will be off by a time t1 from the moment when the blade 113 is first in detection proximity to the sensor 115 and off by a time t3 from the moment when the blade 113 moves away from the detection proximity of sensor 115. The time t1 should be equal to time t3. The time span between the leading edge of the pulse and the moment that the blade moves away from the detection proximity is considered time t2. The signal generated from Hall Effect circuit 320 is fed into timing circuit 330 and voltage signal circuit 350.

Voltage signal circuit 350 comprises a frequency to voltage converter 355. Converter 355 converts the signal from Hall Effect circuit 320 to a single converted voltage. The level of this converted voltage depends on the frequency of the voltage signal. Converter 355 incorporates a linear relationship in this conversion. As a result, a higher frequency Hall Effect signal results in a higher converted voltage produced by converter 355. A low frequency Hall Effect signal results in a low converted voltage produced by converter 355. The voltage from converter 355 is then supplied to timing circuit 330.

Timing circuit 330 comprises a comparator circuit and a logic circuit. The comparator circuit comprises a first 335A and second 335*b* comparators. The logic circuit comprises a first 345A and second 345B logic gates. The signals from the Hall Effect circuit 320 and the voltage signal circuit 350 are fed into the first 335A and second 335B comparators. The comparators 335A and 335B apply the voltage signal generated by circuit 350 to the Hall Effect signal generated by Hall Effect circuit 320. The comparators 335A and 335B output a partially corrected signal that has undergone a phase period shift. The degree of the phase/period shift depends upon the frequency of the Hall Effect signal and the voltage supplied by the voltage signal circuit 350. This partially corrected signal is fed into logic gates 345A and 345B. The logic gates 345A and 345B further shift the phase/period of the partially corrected signal to generate a corrected signal. The phase/period shift of the corrected signal is characterized by a pulse width that is increased. The corrected signal can also be characterized by a pulse with a leading edge that is aligned in time with the location of the position of blade 113, i.e. the position of the optimum power state of the engine such as the compression position of a piston.

The corrected signal from timing circuit 330 is fed into buffer circuit 370. Buffer circuit 370 comprises logic gates 74A and 74B. Buffer circuit 370 inverts the pulse of the corrected signal from a low, or trough, to a high, or peak. As a result, a leading edge of the pulse is formed from ground to 5 volts and a trailing edge of the pulse is formed from 5 volts to ground. Buffer circuit 370 intern supplies the inverted corrected signal to an ignition box to trigger the spark plugs. Thus, the leading edge of the corrected pulse, which is aligned with the optimum power state of the engine, will trigger the ignition box. The result of this processing of the Hall Effect signal into a corrected signal and intern to invert that signal, is to produce a signal that is in phase with the phase of the optimum power state of the engine, such as the phase of the pistons.

The operation of circuit 300 will now be discussed by way of example. Hall Effect Sensor 322 is mounted in a position so as to detect the relative position of blades mounted on a rotating shaft. The position of these blades correspond to the optimum power state of an engine, such as the compression position of oscillating piston elements. A first blade approaches Hall Effect sensor 322, comes within a minimum distance of Hall Effect sensor 322, and moves beyond Hall Effect sensor 322, generating a Hall Effect signal. The Hall Effect signal has a first low or trough that corresponds with the minimum distance between the first blade and the sensor 322. The first low is out of phase with the position of the first blade by a time amount t. The signal also has a high or peak that corresponds to the moment when the sensor 322 moves away from the triggering position of the sensor 322. The resulting signal is a pulse with a leading edge and a trailing edge. As the second blade approaches the sensor 322, this forms a second low. The Hall Effect signal is fed into a voltage signal circuit 350. The voltage signal circuit creates a voltage signal at a single (or constant) voltage level that linearly corresponds to the frequency of the Hall Effect signal. The Hall Effect signal and the voltage signal are fed into timing circuit 330. The timing circuit 330 uses the voltage signal to delay the Hall Effect signal, or shift the phase/period of the Hall Effect signal. Thus, the degree of phase/period shift of the Hall Effect signal is in proportion to the frequency of the Hall Effect signal. The timing circuit 330 outputs a corrected signal that has undergone a phase/period shift. As a result, the corrected signal has a phase that is either in phase or out of phase by a time less than t with the position of the blades on the rotating shaft. Thus, the corrected signal is substantially in phase with the rotation of the blades and consequently the optimum power state of the engine. The timing circuit feeds this corrected signal to a buffer circuit 370. Buffer circuit 370 inverts the corrected signal such that the leading edge of the inverted signal will trigger the ignition box when the engine is in an optimum power state. Buffer circuit 370 applies the corrected signal to the ignition box. Due to circuit 300 the signal applied to the ignition box is now in phase with the optimum power state of the engine. This improves the efficiency of the engine at higher RPM levels.

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Further, although the invention has been described with reference to a particular arrangement of parts, features and the like, these are not intended to exhaust all possible arrangements or features, and indeed many other modifications and variations will be ascertainable to those of skill in the art.

What is claimed is:

1. A circuit for correcting signal timing, comprising:

a first signal circuit that generates a first signal with a first phase that is out of phase with the periodic object;

a voltage signal circuit comprises a frequency to voltage converter and produces a voltage signal that corresponds to the frequency of the first signal; and a timing circuit that receives the first signal and the voltage signal and produces a second signal with a second phase that is substantially in phase with the periodic object;

wherein the first signal circuit is a Hall Effect circuit and the first signal is a Hall Effect signal.

2. The circuit of claim 1, wherein the frequency to voltage converter generates the voltage signal in linear relation to the frequency of the Hall Effect signal.

3. The circuit of claim 2, wherein the timing circuit comprises at least one comparator.

4. The circuit of claim 3, wherein the at least one comparator receives the Hall Effect signal and the voltage signal.

5. The circuit of claim 4, wherein the timing circuit comprises at least one logic gate.

6. The circuit of claim 5, further comprising a buffer circuit that receives the second signal and supplies the second signal to an ignition box.

7. The circuit of claim 6, wherein the buffer circuit comprises at least one logic gate.

8. The circuit of claim 7, further comprising a voltage regulator circuit.

9. The circuit of claim 8, wherein the voltage regulator circuit supplies a regulated voltage to the voltage regulator circuit, the timing circuit, the voltage signal circuit, and the buffer circuit.

10. The circuit of claim 1, wherein the periodic object is a rotating shaft or at least one oscillating piston.

11. A circuit for correcting signal timing, comprising:

a first signal circuit that detects a periodic motion of a periodic object and generates a first signal with a first phase that is out of phase with the periodic object;

a voltage signal circuit comprises a frequency to voltage converter that receives the first signal and produces a first voltage signal in the event that the first signal has a first frequency and produces a second voltage signal in the event that the first signal has a second frequency; and a timing circuit that receives the first signal and either voltage signal and produces a second signal with a second phase that is substantially in phase with the periodic object;

wherein the first signal circuit is a Hall Effect circuit and the first signal is a Hall Effect signal.

12. The circuit of claim 11, wherein the frequency to voltage converter generates a voltage signal in linear relation to the frequency of the first signal.

13. The circuit of claim 11, wherein the timing circuit comprises at least one comparator and at least one logic gate.

14. The circuit of claim 11, further comprising a buffer circuit that receives the second signal and inverts the second signal.

15. The circuit of claim 11, wherein the first phase is out of phase with the periodic object by a time t and the second phase is in phase with the periodic object by a time less than t.

16. The circuit of claim 11, wherein the periodic object is a rotating shaft or at least one oscillating piston.

17. A circuit for correcting the ignition timing in an engine, comprising:

a first signal circuit that detects a periodic motion of a periodic object that corresponds to an oscillating piston and generates a first signal with a first phase that is out of phase with the periodic object;

a voltage signal circuit comprises a frequency to voltage converter and produces a voltage signal that corresponds to the frequency of the first signal;

a timing circuit that receives the first signal and the voltage signal and produces a second signal with a second phase that is substantially in phase with the periodic object; and an ignition box that receives the second signal and triggers at least one spark plug;

wherein the first signal circuit is a Hall Effect circuit and the first signal is a Hall Effect signal.

18. The circuit of claim 17, wherein the voltage signal circuit receives the first signal and produces a first voltage signal in the event that the first signal has a first frequency and produces a second voltage signal in the event that the first signal has a second frequency.

19. The circuit of claim 18, wherein the frequency to voltage converter generates a voltage signal in linear relation to the frequency of the first signal.

20. The circuit of claim 17, wherein the timing circuit comprises at least one comparator and at least one logic gate.

21. The circuit of claim 17, further comprising a buffer circuit that receives the second signal and inverts the second signal.

22. The circuit of claim 17, wherein the first phase is out of phase with the periodic object by a time t and the second phase is in phase with the periodic object by a time less than t.

23. The circuit of claim 17, wherein the periodic object is a rotating shaft or at least one oscillating piston.

* * * * *